United States Patent [19]

Newman

[11] Patent Number: 5,323,654
[45] Date of Patent: Jun. 28, 1994

[54] SHIELDED SIGHT GLASS

[76] Inventor: Darrell B. Newman, 2419 Windsor, Odessa, Tex. 79761

[21] Appl. No.: 117,282

[22] Filed: Sep. 7, 1993

[51] Int. Cl.⁵ .......................................... G01F 23/02
[52] U.S. Cl. ...................................... 73/326; 73/330; 73/861.55
[58] Field of Search ................... 73/325, 326, 861.55, 73/861.56, 861.57; 137/559

[56] References Cited

U.S. PATENT DOCUMENTS

| | | | |
|---|---|---|---|
| 744,710 | 11/1903 | Barnes | 73/326 |
| 763,300 | 6/1904 | Mason et al. | 73/326 |
| 1,014,456 | 1/1912 | DeGeorgis | 73/326 |
| 1,111,518 | 9/1914 | Ames | 73/326 |
| 1,223,456 | 4/1917 | Werbeck | 73/326 |
| 1,264,785 | 4/1918 | Gibbs | 73/326 |
| 1,382,582 | 6/1921 | Whiteside | 73/326 |
| 1,459,952 | 6/1923 | Ernst | 73/326 |
| 1,629,348 | 5/1927 | Ludwin et al. | 73/326 |
| 2,510,729 | 6/1950 | Van Ham | 73/330 |
| 3,212,334 | 10/1965 | Conlon | 73/326 |
| 3,894,433 | 7/1975 | Riester et al. | 73/861.56 |
| 4,302,980 | 12/1981 | Braatz | 73/861.55 |
| 4,535,634 | 8/1985 | Troutman et al. | 73/747 |
| 4,693,117 | 9/1987 | Mills | 73/326 |
| 5,052,224 | 10/1991 | Ford et al. | 73/326 |

*Primary Examiner*—Daniel M. Yasich
*Attorney, Agent, or Firm*—Marcus L. Bates

[57] ABSTRACT

A sight glass placed between two spaced apart confronting fittings and connected to a vessel to show the level of liquid in the vessel is shielded by a novel transparent plastic enclosure. The enclosure is in the form of a polygon and is made from a sheet of impact resistant plastic. The enclosure includes an elongated main body member having a U-shaped front member that is removably attached to a rear closure member, Upper and lower end members are removably secured to each opposed end of the main body member, Each of the end members have an outwardly opening slot formed therein for slidably receiving and capturing the spaced apart fittings therewithin. The transparent plastic material preferably is polycarbomate which exhibits high impact resistance and thereby offers great protection to the sight glass.

12 Claims, 1 Drawing Sheet

U.S. Patent  June 28, 1994  5,323,654
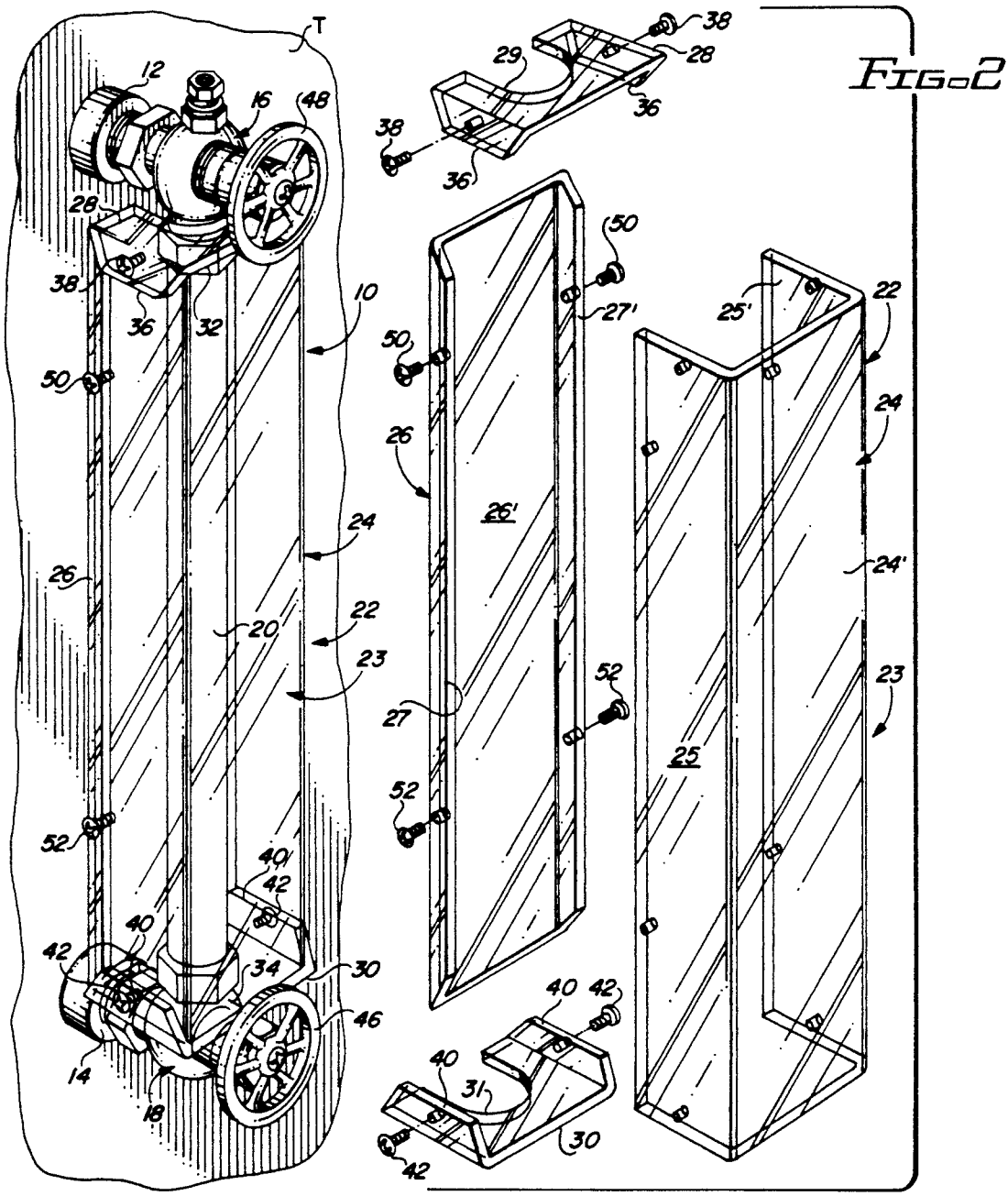
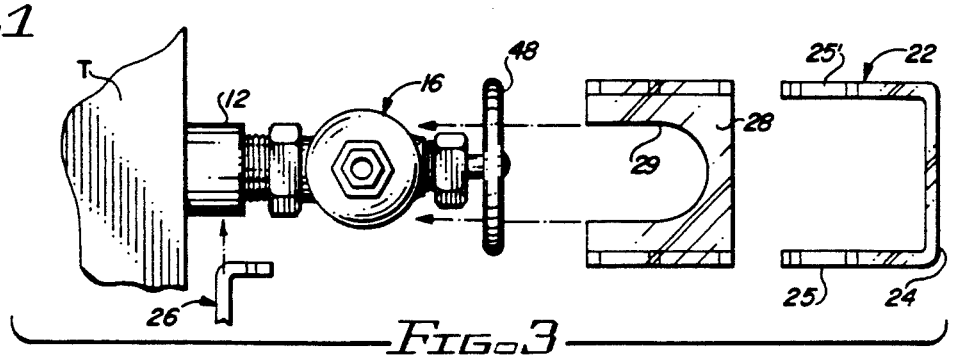

SHIELDED SIGHT GLASS

BACKGROUND OF THE INVENTION

Out in West Texas, there are numerous oil and gas wells connected for hydrocarbons therefrom to flow into storage tanks; or vessels, where the hydrocarbons accumulate and subsequently are transported by pipeline or truck to the refinery. The vessels, of tanks, often are provided with sight gauges of the type having a sight glass that is placed between two spaced apart fittings connected to a vessel or the like so as to show a liquid level therein.

Several times during the year, thunderstorms develop and drop large hailstones from the clouds. The hailstones frequently are of a size to strike and break the unprotected sight glass, whereupon, the contents of the vessel gravitate onto the ground. Sometime, the hailstones are of a size to break windshields of automobiles, and can stun or prove fatal to people and animals.

Sight gauges of this type are al so employed to gauge other vessels, some of which may be under considerable pressure and when the sight glass is broken, the escaping fluid presents a hazard to persons and property.

It is not unusual for a person working in the vicinity of a sight glass to inadvertently strike the sight glass with a tool with sufficient force to break the glass, whereupon the contents of the vessel are free to flow onto the surroundings and contaminate the immediate area.

It would therefore be advantageous to enclose a sight glass within a transparent plastic shield assembly to thereby afford protection to the sight glass.

Numerous sight glass protective shields or guards previously have been proposed, as evidenced by the art cited herein. However, none of the prior art provides a sight glass protective shield having all of the novel attributes found in the present invention.

SUMMARY OF THE INVENTION

This invention specifically relates to an improved transparent, plastic shield assembly that is mounted to enclose a sight glass of the type that is placed between two spaced apart fittings connected to a vessel or the like so as to show a liquid level. The shield assembly of this invention includes an elongated hollow main body having opposed ends. The main body has a transparent U-shaped front member to which there is removably affixed a flanged rear cover. A closure member is attached to each of the opposed ends of the main body to provide a structure in the form of a rigid, transparent, plastic shield assembly. The shield assembly of this invention preferably is in the form of a polygon that is supported from the two spaced apart fittings by the end members. The U-shaped front member comprises an elongated vertical transparent sheet of plastic material bent into the U-shaped cross-sectional configuration, and further includes an upper end opposed to a lower end, there being an opening on one side and closed on the other three sides. The open side provides spaced apart vertical edges that are attached to the flanged rear cover.

The transparent plastic flanged rear cover is removably attached to the open side of the main body member, and comprises an elongated vertical transparent sheet of plastic material having a rear face and opposed parallel marginal edge portions that are bent into elongated flanges arranged perpendicularly respective to the rear face thereof and parallel to one another.

The flanges of the rear cover are slidably received by the edges of the two sides that form the opening into the U-shaped front member to thereby form the main body into a polygon that preferably is of a quadrilateral shaped cross-sectional configuration.

The upper and lower closure members are removably attached to the front member, and each closure member has a rearwardly directed slot formed therein within which the spaced apart fittings are received in captured relationship therewithin, so lo that the sight glass is visible through all sides of the transparent plastic shield assembly which completely surrounds and protects the sight glass on all sides thereof.

Accordingly, a primary object of the present invention is the provision of an improved transparent plastic shield assembly of square or rectangular cross-sectional configuration that is mounted to enclose a sight glass that is placed in axially aligned relationship between two spaced apart confronting fittings connected to a vessel or the like so as to show a liquid level;

Another object of the invention is to provide an improved transparent plastic shield assembly for a sight glass of a sight gauge that protects the sight glass from inadvertent heavy impact of tools or other objects, including hail stones from West Texas hail storms;

A further object of this invention is to disclose and provide an improved transparent plastic shield assembly that can be assembled about a sight glass without removing any of the components of the sight gauge;

A still further object of this invention is to provide an improved, tough, transparent plastic shield assembly made from a sheet of plastic that is cut to the required size and then bent into the required configuration, in accordance with this disclosure;

Another and still further object of this invention is the provision of a new combination of a shield assembly and sight glass, wherein the shield assembly is made of a plurality of transparent parts of plastic material and particularly of deformed polycarbonate plastic, that can be assembled about the sight glass without removing any of the components of the sight gauge.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a broken, perspective view of a sight gauge and transparent plastic shield assembly made in accordance with this invention;

FIG. 2 is an isolated, exploded, perspective view of the transparent plastic shield assembly of FIG. 1 showing further details of this invention; and, FIG. 3 is a partial cross-sectional view of the transparent plastic shield assembly and the sight gauge of FIG. 1, and taken along line 3—3 of FIG. 1, and shown dissembled and removed from the sight gauge.

DETAILED DESCRIPTION OF THE PREFERRED EMBODIMENT

The Figures of the drawings diagrammatically disclose a vessel or tank T to which there is attached the combination 10 of this invention. According to this invention, there is a sight gauge 20 of the type that is placed between two spaced apart fittings 12, 14, 16 and 18 connected to the vessel or tank T, or the like, so as to show a liquid level of the contents of the vessel.

A sight gauge 20 of ordinary construction is placed between the before mentioned spaced apart fittings 12, 14, 16 and 18 so as to show a liquid level within tank T. FIG. 1 shows the glass sight gauge 20 totally enclosed within the novel transparent plastic shield assembly 22, which is made in accordance with this invention.

In FIGS. 1, 2 and 3, the shield assembly 22 includes an elongated main body 23 having opposed ends. The main body 23 has a U-shaped front member 24 to which there is removably affixed a flanged rear cover 26. Upper closure member 28 and lower closure member 30 are attached to the opposed ends of main body 23 to provide the before mentioned rigid plastic shield assembly 22 in the form of a polygon having opposed ends that are supported from the two spaced apart assembly of fittings 12, 14, 16 and 18 by means of the opposed closure members 28 and 30 of the novel transparent plastic shield assembly 22.

The two spaced apart assemblies of sight glass fittings 12, 14, 16 and 18 include upper and lower nipples 12 and 14; upper and lower valve devices 16 and 18; and upper and lower confronting hollow sockets 32 and 34. The opposed marginal ends of the sight gauge 20 are received within the confronting sockets 32 and 34.

FIGS. 1, 2 and 3 show the U-shaped front member 24 comprises an elongated vertical transparent sheet of plastic material having a face 24' and opposed parallel marginal edges 25, 25' bent with a very small radius of curvature to form the front member 24 into the illustrated U-shaped cross-sectional configuration. Hence the opposed, depending, parallel, portions form the two parallel depending edges 25, 25'. Thus the front member 24 is open on one side and closed on three sides, with the open side providing spaced-apart vertical edges 25, 25'. The U-shaped front member 24 further has an upper end opposed to a lower end.

The transparent plastic flanged rear cover 26 is removably attached to the parallel edges 25, 25' that form the open side of the main body member 23. The rear cover 26 comprises an elongated vertical transparent sheet of plastic material having a rear face 26' and opposed parallel marginal edge portions 27, 27' that are bent into elongated flanges arranged perpendicularly respective to the rear face thereof and parallel to one another.

Therefore, the rear cover 26 has two opposed parallel flanges 27, 27' which slidably engage the opposed parallel edges 25, 25' that form the opening into the U-shaped front member to thereby form the main body 23 into a polygon that has a quadrilateral shaped cross-sectional configuration, as best seen illustrated in FIGS. 1 and 3 of the drawings.

The upper and lower closure members, 28 and 30, are removably attached to the front member, and each closure member 28, 30, respectively, has a rearwardly directed slot 29, 31, respectively, formed therein within which the two spaced apart sockets 32, 34 of the fittings of the sight glass are received in captured relationship therewithin. It should be noted that the opposed 25 upper and lower edges of the face of the rear cover 26 closes the slot of the end closure members 28, 30 and thereby securely attaches the main body 23 to the fittings of the sight glass. The upper and lower closure members, 28 and 30, are provided with the illustrated ears 36 and 40 depending therefrom that are bent into a right angle for attachment at 38 and 42 to the main body member 23.

Hence the sight glass 20 is visible through the transparent plastic shield assembly which protectively surrounds the sight glass on all sides thereof. The upper and lower valves, 16 and 18, have handles 46 and 48 for manipulating the valve.

The shield assembly for the sight glass preferably is fabricated from an elongate sheet of transparent protective material. The rear cover has opposed ends that close the rearwardly directed slot 29, 31 of the upper and lower closure members, as mentioned herein before. The elongated sheet of transparent material preferably is made of high impact resistant polycarbonate plastic material that is coated to prevent the deleterious effects of ultraviolet light.

The opposed parallel edges of the U-shaped member 24 are affixed to the upper and lower closure members, 28 and 30, after which the spaced sockets 32 and 34 are received within the rearwardly directed slots of the upper and lower closure members, and thereafter the rear cover is affixed to the front member by suitable fasteners, such as #6 stainless steel sheet metal screws 50, 52.

In operation, the shield assembly 22 is preferably made from a ⅛ inch thick sheet of polycarbomate plastic and is cut into the appropriate configuration for the four pieces of the shield assembly, including the front U-shaped member, the rear closure, and the upper and lower members. The edge portions that form the U, the flanges of the rear cover, and the ears of the upper and lower closure members are bent into the before mentioned perpendicular configuration by placing the related cut pieces in an ordinary metal break and turning the marginal edge thereof 90 degrees, just as one would deform a sheet of metal.

Next, the length of the main body is selected, and cut to the proper length by an ordinary saw. The holes for accommodating the fasteners are drilled into the parallel edges, flanges, and the upper and lower closure members. Then the upper and lower closure members are attached to the U-shaped front member using the appropriate fasteners, such as sheet metal screws, with the slots 29 and 31 thereof extending rearward as illustrated in the drawings. The assembled front member is positioned about the sight glass by sliding the sockets into the rearwardly directed slots 29 and 31 of the upper and lower members. Next, the flanged rear cover 26 is mated to the front main body member 23 and suitably fastened thereto, thus enclosing the sight glass within an unbreakable shield or housing that provides 360 degrees of visibility.

Hence the confronting sockets of the valve device support the shield assembly. The shield assembly is arranged to prevent damage to the sight glass, which is totally enclosed therewithin. The strength of the shield assembly offers protection against vandalism caused by gunfire and thrown objects, as well as natural occurring devastating phenomena and accidental impact with foreign objects caused by workmen.

It is unnecessary to remove parts of the sight gauge in order to install the sight glass shield of this invention. The sight glass shield is easily anchored about the gauge cock, and no additional fittings or the like is required.

In the unlikely event the sight glass is broken, the resultant glass debris is contained within the shield apparatus, and not scattered on the ground.

It is considered within the comprehension of this invention to make the opposed upper and lower closure members 28, 30 integral respective to the U-shaped front member 24 by extending a tab from the opposed side walls thereof, and configuring the tabs such that when they are bent perpendicular respective to the longitudinal axis of the front member, and towards one another, they assume the configuration of the slotted closure members 28, 30. Such an expedient reduces the number of parts to only a main body member and rear cover, not counting the fastener means.

I claim:

1. A transparent plastic shield assembly for a sight gauge of the type having a sight glass that is placed between two spaced apart fittings connected to a vessel or the like so as to show a liquid level, said shield assembly includes an elongated main body having opposed ends, said main body has a U-shaped front member to which there is removably affixed a flanged rear cover, a closure member attached to each of said opposed ends to provide a rigid plastic shield assembly in the form of a polygonic enclosure that can be supported from two spaced apart fittings by said closure members, said U-shaped front member comprises an elongated vertical transparent sheet of plastic material bent into said U-shaped cross-sectional configuration and having an upper end opposed to a lower end, and being open on one side and closed on three sides, the open side providing spaced-apart vertical edges;

said flanged rear cover is removably attached to the open side of said U-shaped front member; said flanged rear cover comprises an elongated vertical transparent sheet of plastic material having a rear face and opposed parallel marginal edge portions that are bent into elongated flanges arranged perpendicularly respective to the rear face thereof and parallel to one another;

the flanges of said rear cover are slidably received by the spaced apart vertical edges that form the opening into the U-shaped front member to thereby form the main body into a polygon that is of a quadrilateral shaped cross-sectional configuration;

said closure members are removably attached to said U-shaped front member, each said closure member has a rearwardly directed slot formed therein within which the two spaced apart fittings can be received in captured relationship therewithin;

whereby the sight gauge is visible through said transparent plastic shield assembly which protectively surrounds the sight gauge on all sides thereof.

2. A shielded sight glass according to claim 1, wherein said elongated main body is made of a sheet of transparent plastic material, and said rear cover has opposed ends that close the rearwardly directed slot of said closure members.

3. A shielded sight glass according to claim 2 wherein said elongated main body is formed of polycarbomate plastic.

4. A shielded sight glass according to claim 1 wherein said U-shaped front member is affixed to said closure members, after which the spaced fittings are received within the rearwardly directed slots of the closure members, and thereafter the rear cover is affixed to the U-shaped front member.

5. In combination with a sight gauge for gauging a tank, said sight gauge having upper and lower valves attached to the tank that include upper and lower confronting sockets in predetermined spaced relation with a transparent tubular sight glass attached to and extending therebetween, and having means for retaining said sight glass in fluid tight relation in said sockets, a shield assembly arranged about said sight glass for protecting said sight glass comprising:

an elongated hollow transparent main body surrounding the sight glass and having opposed upper and lower ends closed by opposed closure members, means mounting said closure members to said upper and lower valves;

said main body includes a transparent front U-shaped member and a rear plastic cover for said U-shaped member; said front U-shaped member, rear plastic cover, and closure members being attached to one another to provide a rigid plastic shield assembly supported from the two spaced apart fittings;

said front U-shaped member comprises an elongated vertical transparent sheet of plastic material bent into perpendicular parallel walls to provide an elongated U-shaped cross-sectional configuration and having an upper end opposed to a lower end, and being open on one side and closed on three sides, the open side providing spaced-apart vertical edges;

said rear plastic cover is removably attached to the open side of the front U-shaped member; said rear cover comprises an elongated vertical transparent sheet of plastic material having a face and opposed parallel marginal edge portions bent into an elongated flange arranged perpendicularly respective to the face thereof and parallel to one another;

the flanges of said rear cover are slidably received by spaced apart vertical edges of the open side that forms the opening into the front U-shaped member to thereby form a polygon that is of a quadrilateral shaped cross-sectional configuration, said polygon having an upper end opposed to a lower end;

whereby, said closure members are mounted to the confronting sockets, and the rear cover flanges attached to the spaced apart vertical edges of the front U-shaped member to provide said sight glass with the shield assembly.

6. The combination of claim 5 wherein said elongate sheet of transparent plastic material is made of polycarbonate plastic, and said rear cover has opposed ends that close the rearwardly directed slot of said closure members.

7. A shielded sight glass according to claim 5 wherein said elongated transparent sheet of plastic material is formed of polycarbonate plastic.

8. A shielded sight glass according to claim 5 wherein said front U-shaped member is affixed to said closure members, the spaced fittings are received within the rearwardly directed slots of the closure members, and the rear cover is affixed to the front U-shaped member.

9. An improved transparent plastic shield assembly within which a sight gauge can be enclosed; the sight gauge being of the type that is placed between two spaced apart fittings connected to a vessel or the like so as to show a liquid level, said shield assembly includes an elongated main body member, a plastic cover, and end members attached to one another to provide a rigid plastic shield assembly adapted to be supported from the two spaced apart fittings associated with a sight gauge;

said elongated main body member comprises an elongated vertical transparent sheet of plastic material bent into a U-shaped cross-sectional configuration and having an upper end opposed to a lower end, and being open on one side and closed on three sides, the open side providing spaced-apart vertical edges;

said plastic cover is removably attached to the open side of the main body member; said plastic cover comprises an elongated vertical transparent sheet of plastic material having a face and opposed parallel marginal edge portions bent into elongated flanges arranged perpendicularly respective to the face thereof and parallel to one another;

the flanges of said plastic cover are slidably received by the vertical edges of the open side that forms the opening into the main body member to thereby form a polygon that is of a quadrilateral shaped cross-sectional configuration, said polygon having an upper end opposed to a lower end, a closure member attached at the opposed ends of the polygon, each said closure member has a rearwardly directed slot formed therein and is adapted to receive spaced apart fittings of a sight gauge in captured relationship therewithin;

whereby the sight gauge is visible through said transparent plastic shield assembly which protectively surrounds the sight gauge on all sides thereof.

10. The shield assembly according to claim 9 wherein said elongate sheet is of transparent plastic material, and said rear cover has opposed ends that close the rearwardly directed slot of said closure members.

11. A shielded sight gauge according to claim 10 wherein said elongated sheet of plastic material is formed of polycarbomate plastic.

12. A shielded sight gauge according to claim 9 wherein said U-shaped part is affixed to said closure members, after which the spaced fittings may be received within the rearwardly directed slots of the closure members, and thereafter the rear cover is affixed to the main body member.

* * * * *